US011291212B2

(12) United States Patent
Shah et al.

(10) Patent No.: US 11,291,212 B2
(45) Date of Patent: Apr. 5, 2022

(54) FOOD PRODUCT HAVING STABLE CRISPY TEXTURE

(71) Applicant: THE HERSHEY COMPANY, Hershey, PA (US)

(72) Inventors: Utkarsh Shah, Hershey, PA (US); Gagan Mongia, Hummelstown, PA (US); Supapong Siris, Hummelstown, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 170 days.

(21) Appl. No.: 15/747,607

(22) PCT Filed: Aug. 11, 2016

(86) PCT No.: PCT/US2016/046465
§ 371 (c)(1),
(2) Date: Jan. 25, 2018

(87) PCT Pub. No.: WO2017/027659
PCT Pub. Date: Feb. 16, 2017

(65) Prior Publication Data
US 2018/0213803 A1 Aug. 2, 2018

Related U.S. Application Data

(60) Provisional application No. 62/203,433, filed on Aug. 11, 2015.

(51) Int. Cl.
*A21D 2/36* (2006.01)
*A21D 2/18* (2006.01)
*A21D 2/26* (2006.01)
*A21D 13/066* (2017.01)

(52) U.S. Cl.
CPC .............. *A21D 2/36* (2013.01); *A21D 2/186* (2013.01); *A21D 2/265* (2013.01); *A21D 2/266* (2013.01); *A21D 13/066* (2013.01)

(58) Field of Classification Search
None
See application file for complete search history.

(56) References Cited

U.S. PATENT DOCUMENTS

| 5,523,106 A | 6/1996 | Gimmler et al. |
| 5,871,801 A | 2/1999 | Kazemzadeh |
| 2004/0067282 A1 | 4/2004 | Karwowski et al. |
| 2005/0202125 A1 | 9/2005 | Bosch et al. |
| 2006/0008563 A1 | 1/2006 | Baumgartner et al. |
| 2008/0182003 A1 | 7/2008 | Baker et al. |
| 2008/0182004 A1 | 7/2008 | Baker et al. |
| 2008/0187642 A1 | 8/2008 | Ekanayake et al. |
| 2008/0213432 A1 | 9/2008 | Bunke et al. |
| 2009/0202700 A1* | 8/2009 | Bunke .................. A21D 10/025 426/549 |
| 2010/0015284 A1 | 1/2010 | Wheeler et al. |
| 2010/0015297 A1 | 1/2010 | Wheeler et al. |
| 2010/0015298 A1 | 1/2010 | Wheeler et al. |
| 2010/0098829 A1 | 4/2010 | Anand et al. |
| 2011/0045146 A1 | 2/2011 | Canty et al. |
| 2011/0256293 A1 | 10/2011 | Palta et al. |
| 2013/0156893 A1* | 6/2013 | Han ........................ A23L 19/09 426/72 |
| 2015/0366249 A1 | 12/2015 | Lock et al. |

FOREIGN PATENT DOCUMENTS

| EP | 1574138 A1 | 9/2005 |
| WO | 2010/008688 A1 | 1/2010 |
| WO | 2014/118183 A1 | 8/2014 |

OTHER PUBLICATIONS

Nikoley, R., "Resistant Starch Content of Foods; Other Anecdote and Miscellania", available at http://freetheanimal.com/2013/08/resistant-starch-content-of-foods-other-anecdote-and miscellania.html, dated Aug. 22, 2013, 4 pages.

Spector, D., "Why You Can't Trust The Calorie Counts That You Find On Food", available at http://www.businessinsider.com/calorie-counts-arent-accurate-2013-7, dated Jul. 16, 2013, 3 pages.

Zhang, P. et al., "Banana Starch: production, physicochemical properties, and digestibility—a review", Carbohydrate Polymers, vol. 59, pp. 443-458 (2005).

\* cited by examiner

*Primary Examiner* — Jenna A Watts

(74) *Attorney, Agent, or Firm* — McNees Wallace & Nurick LLC

(57) ABSTRACT

A crispy textured ambient shelf-stable food product is formed from a dough that includes at least 50% by weight of a fruit and/or vegetable, starch and fat. The food product has a moisture content of less than 4% by weight and exhibits reduced moisture uptake such that the food product has a moisture content of less than 7% by weight after 2 weeks exposure to ambient conditions of 50% humidity at 23° C.

15 Claims, No Drawings

FOOD PRODUCT HAVING STABLE CRISPY TEXTURE

RELATED APPLICATIONS

This application claims the benefit of and priority to U.S. App. No. 62/203,433 filed Aug. 11, 2015, which is hereby incorporated by reference in its entirety.

FIELD

This application is directed to a food product and a method of making the same. More particularly, the present invention is directed to a food product having a stable crispy texture formed of a dough having high amounts of fruit and/or vegetable solids.

BACKGROUND

The amount of natural sugars along with soluble and insoluble fibers in fruit gives most fruits a high propensity to hold moisture. As a result, food products with hard and crispy textures while also being stable at ambient conditions are difficult to obtain and not readily available in the marketplace. Most conventional fruit-based snacks are soft or chewy, or quickly become so, when exposed to ambient conditions.

This problem has been addressed by numerous technologies which have been designed to produce crispy fruit snacks that are dehydrated, vacuum dried, fried or freeze dried. Each of these technologies have drawbacks associated with them. Drying techniques such as freeze drying and vacuum drying are expensive and still do not produce crispy fruit textures that remain stable under ambient conditions. While the product may be crispy initially upon drying and can retain that crispiness for limited periods of time, particularly if well-packaged, freeze dried and vacuum dried fruits start absorbing moisture as soon as the package is opened by the consumer and the product exposed to ambient conditions. This results in the dried products softening and losing crispiness over time.

Frying can produce more stable textures, but results in a product that is high in calories from the fat of frying, reducing the overall nutritional value of the snack. Fried snacks are also often undesirable to consumers seeking healthy snack alternatives. Further, because of the high natural sugar contents in fruit (typically fructose and glucose), frying and baking can lead to browning and charring.

SUMMARY

The present disclosure is directed to overcoming these and other drawbacks by providing snacks high in real fruit and low in moisture to achieve a hard and crispy texture, but which do not suffer from problems such as browning, charring and instability (moisture absorption) seen in known products high in real fruit content.

Exemplary embodiments are directed to a food product having more than 50% by weight of real fruit or vegetable content, the food product also having a crispy texture that remains stable under ambient conditions.

In an embodiment, a crispy textured food product is formed of a dough in which the dough comprises at least 50% by weight of a fruit and/or vegetable, starch, and fat and the food product has a moisture content of less than 4% by weight and exhibits reduced moisture uptake such that the food product has a moisture content of less than 7% by weight even after 2 weeks and up to five weeks after exposure to ambient conditions of 50% humidity at 23° C.

In one embodiment, a crispy textured food product is formed from a dough in which the dough comprises at least 70% by weight of a fruit and/or vegetable, with about 35% to 45% of the fruit or vegetable content present as a powdered fruit or vegetable; starch, the dough comprising about 35% to about 45% by weight starch, wherein the dough comprises about 5% to about 25% by weight added starch, the balance of starch provided by the fruit or vegetable content; fat; and up to 1% by weight of an emulsifier. The food product has a moisture content of less than 4% by weight and exhibits reduced moisture uptake such that the food product has a moisture content of less than 6.5% by weight after 4 weeks exposure to ambient conditions of 50% humidity at 23° C.

In still another embodiment, a method of making a food product comprises mixing a composition comprising a fruit or vegetable, starch, and fat to form a dough, in which the composition is at least 50% by weight of the fruit or vegetable and removing moisture from the dough to an amount less than 4% by weight to form a crispy textured ambient shelf-stable food product that exhibits a moisture content of less than 7% by weight after 4 weeks exposure to ambient conditions of 50% humidity at 23° C.

Among the advantages of exemplary embodiments is that a food product is provided that has a high percentage of real fruit or vegetable content and has a hard and crispy texture and which does not quickly soften upon exposure to ambient conditions in the same way conventional products do, but instead the texture remains stable for longer periods.

Another advantage is that by adjusting the glass transition temperature above room temperature, the product does not readily absorb moisture under ambient conditions, retaining its hard and crispy texture even after the package is opened.

Yet another advantage is the product can be formed using baking at ordinary atmospheric conditions while avoiding charring.

Other features and advantages of the present invention will be apparent from the following more detailed description of exemplary embodiments that illustrate, by way of example, the principles of the invention.

DETAILED DESCRIPTION OF EXEMPLARY EMBODIMENTS

Exemplary embodiments are directed to a food product having a crispy texture that is high in real fruit and/or vegetable content, typically made from at least 50% fruit and that has a stable, crisp texture even after several weeks of exposure to ambient room temperature conditions.

Exemplary embodiments employ an ingredient system that includes fruit, starch, fat, and optionally protein, leavening agent and/or other additives. While primarily described herein with respect to fruit, it will be appreciated that the principles of the invention may be equally applied with vegetables, which may be used in combination with or in place of fruit.

The product formulation contains at least 50% by weight of real fruit, such as at least 60% by weight, at least 70% by weight or at least 80% by weight real fruit. The term fruit is used to refer to fleshy fruits (i.e., those foods generally classified as a fruit for nutritional, rather than biological, purposes). Fleshy fruits generally have greater than about 75% by weight water when in their natural form.

Exemplary types of fruits that may be used include, but are not limited to, apples, apricots, bananas, berries such as strawberries, blueberries, raspberries, blackberries, acai berries, boysenberries, gooseberries, and elderberries, cherries, citrus, such as grapefruit, oranges, lemons, limes, tangerines and ugli fruit, figs, grapes, guava, jackfruit, kiwi fruit, mangoes, melons, such as cantaloupe, honeydew, and watermelon, nectarines, peaches, pears, papaya, passion fruit, pawpaw, pineapple, plantains, plums, and quince.

The real fruit content comprises fruit flesh that may be present in any form or combination of forms that still yields a product as described herein and thus may contain any range of moisture content from their natural amount to fully dried. In some embodiments, the real fruit content is a combination of a puree and a powder (including, without limitation, fruit flours), with up to 70% by weight of the product formulation comprising fruit puree. It will further be appreciated that the fruit source for fruit content does not need to be a single fruit and that multiple different fruits may be combined in the same or different form. Additionally, the fruits may be used in either their ripened or green/unripe form and, as noted, may contain any range of moisture from their natural amount, such as in the form of a puree, to fruit concentrate, to fruits dried to remove or eliminate moisture content and then ground in the form of flour or other fruit powder.

In some embodiments, the fruit content is a combination of fruit puree and fruit powder. Any dried fruit (or vegetable) ground into powder may be used, and in some embodiments the fruit powder is a flour or fiber powder of one or more of the banana family (e.g., any of the cultivars of the *Musa* genus) such as green banana flour, yellow banana flour and plantain flour, for example. Other suitable fruit (vegetable) flours include apple flour, apple fiber powder, and squash flour, for example. The relative amounts of fruit puree to fruit powder may vary. In some embodiments, the fruit may be entirely fruit puree, while in other embodiments up to 50% or more of the fruit may be in the powder form. Typically, the fruit powder is about 35% to about 45% by weight of the total real fruit content in the product formulation, although it will be appreciated that greater or lesser amounts may be used.

The fruit includes some starch content, particularly when fruit flour is employed. Some embodiments include an added starch so that the total starch content of the product formulation is about 25% up to about 50% by weight, typically in the range of about 35% to about 45% by weight starch, such as about 35%, about 36%, about 37%, about 38%, about 39%, about 40%, about 41%, about 42%, about 43%, about 44%, or about 45% by weight starch and any range or sub-range therebetween. Thus, in some embodiments, the product formulation contains up to about 40% by weight added starch, more typically in the range of 5% to 25% by weight added starch. However, it will be appreciated that both the particular amount of total start, as well as added starch, if any, may depend on a variety of factors including the form of the fruit content as well as the specific fruits that are employed. For example, in some embodiments that use apple fiber powder or other high fiber, low starch fruit content, the total starch content of the dough may be as low as 4% by weight up to about 35% to 45% by weight.

Any culinary starch may be used as the added starch. In some embodiments, the added starch includes, but is not limited to, one or more of corn starch, potato starch or rice starch. Any other cereal or root vegetable starches, for example, may also be employed. In some embodiments, it may be desirable to use a gluten free starch as some exemplary embodiments may be formulated to produce food products that are substantially free of gluten (i.e., less than 20 ppm gluten).

In some embodiments, some or all of the fruit powder may be replaced with one or more other, preferably gluten free, flours, such as those derived from pulses. These include, for example, quinoa, lentil, and pea flours and various combinations.

In some embodiments, some or all of the fruit powder may be replaced with one or more protein powders, such as protein concentrates and/or protein isolates, such that up to about 25%, up to about 50%, up to about 75% or all of the fruit powder is substituted with the protein powder. In certain embodiments, the dough is formulated with about 5% to about 15% by weight protein powder. Any suitable animal or vegetable protein powder may be used, including, but not limited to, soy protein, milk protein, whey protein, pea protein, peanut protein, rice protein, or a combination thereof.

The product formulation includes up to about 10% by weight of a fat, typically in the range of about 2% to about 8% by weight fat, such as about 4% to about 6% by weight fat. The fat includes solid fats, such as butter, lard, shortening or coconut oil, for example, and liquid fats, such as canola, peanut, safflower, sunflower, or other vegetable oil.

The product formulation may also optionally include up to about 1% by weight of a leavening agent, such as baking powder, baking soda, or cream of tartar, for example, while in other embodiments no leavening agent is included.

Up to 1% by weight, more typically up to 0.5% by weight of an emulsifier, such as lecithin may be employed.

Other additives may also be incorporated into the production formulation, including a hydrocolloid, such as xanthan gum, as well as natural and artificial flavorings and preservatives. It will be appreciated however, that an advantage of exemplary embodiments is that a natural product can be provided while still achieving the shelf-stable benefits described without the use of added preservatives, which may be excluded entirely. Surprisingly, unlike many other gluten-free products, exemplary embodiments can still be formulated and produced without hydrocolloids, which are typically used in conventional gluten free products as a gluten replacer.

Furthermore, in some embodiments, additional moisture in the form of liquid content such as water or juice may be added to for adjusting consistency of the dough and/or to hydrate protein in embodiments employing protein powder. In some embodiments, moisture may be added through the introduction of yogurt, which can both provide moisture and protein.

Forming the product generally involves mixing the ingredients of the product formulation followed by moisture removal, such as by baking. The ingredients may be mixed in any order, although mixing dry ingredients such as fruit flour, added starch and/or leavening agent may advantageously be carried out first to evenly combine these ingredients prior to adding fat and then fruit puree or any other fruit ingredients having a high moisture content.

The ingredients are mixed until a uniform mass of dough is achieved, with care to avoid overmixing, which is characterized by increased stickiness that can in turn make processing more difficult. The dough is then formed for baking, such as by sheeting and cutting, extruding, moulding, or any other desired method of forming, including straight sheeted or laminated techniques used in conventional cracker production. The dough can be formed to any thickness, although between 1 mm and 3 mm may be employed in some embodiments, such as about 1.5 to 2 mm. Surprisingly, dough formulated in accordance with exemplary embodiments permits the pulling of web scrap during processing, which can ordinarily not be accomplished with traditional gluten free doughs.

Once formed, the fruit dough is ready for baking, resulting in a food product having a crispy texture that may resemble a cracker in appearance. It will be appreciated that in some embodiments, such as those using a high pressure extruder, some moisture removal is contemporaneous with the extrusion and the moisture amount can be further decreased if necessary using an oven or dryer, for example.

In some embodiments, baking is carried out at atmospheric conditions. The baking may be carried out under a variety of conditions and it will be appreciated that time and temperature of baking can depend on a variety of factors relating to oven load, including size, shape and power, as well as piece size, dimension and weight. The baking or other moisture removal processes reduce the moisture content to less than 4% by weight, preferably between 2.25% and 3.25% by weight.

In some embodiments, baking may be accomplished in a single step, such as baking for 10-15 minutes at a temperature ranging from 300 to 375° F. In other embodiments, a multi-zone oven may be used to bake the dough in as few as 5 to 6 minutes.

Alternatively, a multi-step baking process may be employed. It has been observed that a two step baking in which a first stage of baking at high temperatures for short times, followed by a second stage of baking at lower temperatures for longer times, achieves a crisp texture having the desired properties and which is less likely to exhibit browning or charring in the food product.

In one embodiment, a multi-stage baking process involves baking at a temperature in the range of 320 to 350° F. for three to six minutes followed by baking at a temperature in the range of 212 to 250° F. for twenty to thirty-five minutes.

The described baking steps in combination with the particular product formulations described herein result in a change in the glass transition temperature of the food system from less than room temperature to greater than room temperature (i.e., 23° C.). It will be appreciated that a glass transition temperature for a baked food product may be difficult to identify with specificity using differential scanning calorimetry and other traditional methods of calculating Tg. However, DSC of food products formed in accordance with exemplary embodiments demonstrated no sharp peak over a range of 5° C. to 70° C., meaning that the glass transition occurred over a broad range above 23° C. or was even higher than the range seen in the test. As a result of the Tg greater than 23° C., the product once baked resists moisture pickup from the surrounding environment and maintains its hard, crispy texture even when exposed to ambient conditions.

Exemplary embodiments start with an initial moisture content of less than 4% by weight and remain at a moisture content less than 7% by weight, such as less than 6.5% by weight even after 2 weeks, after 3 weeks, after 4 weeks and up to 5 weeks of exposure at ambient conditions (i.e., 23° C. and 50% relative humidity), still exhibiting a crispy texture that can be confirmed by sensory and technical evaluation.

Exemplary embodiments preferably exhibit a break force greater than 6.5 kg, more than 15 peaks of greater than 15 g when tested with a texture analyzer, or both.

Food products in accordance with exemplary embodiments thus maintain a stable, crispy texture, with up to five weeks for the unpackaged product to lose crispiness at ambient conditions, significantly higher than conventional freeze-dried crispy fruit snacks, which lose crispiness as soon as 20 minutes up to 24 hours under the same conditions.

EXAMPLES

The invention is further described in the context of the following examples which are presented by way of illustration, not of limitation.

Example 1

Example 1 was made by formulating banana puree (51% wt), green banana flour (33.5% wt), rice starch (9% wt). butter (6% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and roiled out on a sheeter to a thickness of 1.75 mm and then docked and cut into strips that were baked at 350° F. for 10-12 minutes.

Example 2

Example 2 was made by formulating banana puree (53% wt), green banana flour (34% wt), rice starch (9% wt) and coconut oil (4% wt). The green banana flour, starch, and baking powder were mixed until evenly combined, after which butter was added with continued stirring until the mixture resembled sand. The banana puree was added and mixed until a dough formed into a single mass.

The mass was formed into a fog and rolled out on a sheerer to a thickness of 1.75 mm and then docked and cut into circles. The circles were baked on a sheet pan containing holes at 325° F. for 5 minutes followed by baking at 220° F. for 30 minutes.

The crisped food products of Examples 1 and 2 were subjected to further testing, with unpackaged pieces placed in chambers having 20%, 40%, 50%, 60% and 80% relative humidity at room temperature. Approximately ten pieces were removed from the chambers each week for seven weeks for texture and moisture analysis. When exposed to relative humidity of 50% or less, consistent with most conditioned spaces, the pieces maintained a crispy texture even after at least five weeks, with product from the 20% and 40% chambers maintaining a crispy texture through the end of the trial period.

Example 3

Example 3 was made by formulating banana puree (51% wt), green banana flour (33.5% wt), pre-gelatinized potato starch (9% wt), butter (6% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 13 minutes.

Example 4

Example 4 was made by formulating banana puree (51% wt), green banana flour (33.5% wt), pre-gelatinized, high amylose corn starch (9% wt), butter (6% wt) and baking powder (0.5% wt). The green banana flour, starch, and baking powder were mixed until evenly combined, after which butter was added with continued stirring until the mixture resembled sand. The banana puree was added and mixed to form a dry, non-cohesive dough.

The dough was formed into a log and rolled out on a sheeter to a thickness of 1.75 mm and then docked and cut into strips that were baked at 350° F. for 11 minutes.

Example 5

Example 5 was made by formulating banana puree (51% wt), green banana flour (33.5% wt), pre-gelatinized, high amylopectin corn starch (9% wt), butter (6% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 10 minutes.

Example 6

Example 6 was made without any additional added starch by formulating banana puree (51% wt), green banana flour (42.5% wt), butter (6% wt) and baking powder (0.5% wt). The green banana flour and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 9 minutes.

Example 7

Example 7 was made by formulating banana puree (51% wt), green banana flour (21.25% wt), rice starch (21.25% wt), butter (6% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 10 minutes.

Example 8

Example 8 was made by formulating banana puree (51% wt), rice starch (42.5% wt), butter (6% wt) and baking powder (0.5% wt). The starch and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm. Undocked dough was baked at 350° F. for 10 minutes.

Example 9

Example 9 was made by formulating banana puree (65% wt), green banana flour (23.5% wt), rice starch (5% wt), butter (6% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a fog and rolled out on a sheeter to a thickness of 1.75 mm and then docked and cut into strips that were baked at 350° F. for 10 minutes.

Example 10

Example 10 was made by formulating banana puree (55% wt), green banana flour (33.5% wt), rice starch (9% wt), butter (2% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 11 minutes.

Example 11

Example 11 was made by formulating banana puree (53% wt), green banana flour (33.5% wt), rice starch (9% wt), butter (4% wt) and baking powder (0.5% wt). The green banana flour, starch, and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into strips that were baked at 350° F. for 11 minutes.

Example 12

Example 12 was made by formulating spinach puree (51% wt), green banana flour (33.5% wt), rice starch (9% wt), butter (6% wt) and baking powder (0.5% wt). The green banana flour, starch, and baking powder were mixed until evenly combined, after which butter was added with continued stirring until the mixture resembled sand. The spinach puree was added and mixed until a dough formed into a single mass.

The mass was formed into a log and rolled out on a sheeter to a thickness of 1.75 mm and then docked and cut into circles that were baked at 350° F. for 12 minutes.

Example 13

Example 13 was made by formulating banana puree (51% wt), green banana flour (18.5% wt), rice starch (9% wt), rice protein (7.5% wt), pea protein (7.5% wt), butter (6% wt) and baking powder (0.5% wt). The green banana flour, starch, protein and baking powder were mixed until evenly combined, after which butter was added with continued stirring until the mixture resembled sand. The banana puree was added and mixed until a dough formed into a single mass.

The mass was formed into a log and rolled out on a sheeter to a thickness of 1.75 mm and then docked and cut into circles that were baked at 350° F. for 13 minutes.

Example 14

Example 14 was made by formulating guava puree (50% wt), green banana flour (33% wt), rice starch (9% wt), butter (6% wt), lime juice (1.5% wt) and baking powder (0.5% wt). The green banana flour, starch, and baking powder were mixed until evenly combined, after which butter was added with continued stirring until the mixture resembled sand. The guava puree and lime juice were added and mixed until a dough formed into a single mass.

The mass was formed into a log and rolled out on a sheeter to a thickness of 1.75 mm and then docked and cut into circles that were baked at 350° F. for 11 minutes.

Example 15

Example 15 was made by formulating pear puree (50% wt), green banana flour (33% wt), rice starch (9% wt), butter (6% wt), lime juice (1.5% wt) and baking powder (0.5% wt). The green banana flour, starch, and baking powder were mixed until evenly combined, after which butter was added with continued stirring until the mixture resembled sand. The pear puree was added and mixed until a dough formed into a single mass.

The mass was formed into a log and rolled out on a sheeter to a thickness of 1.75 mm and then docked and cut into circles that were baked at 350° F. for 11 minutes.

Example 16

Example 16 was made by formulating banana puree (52% wt), green banana flour (18.5% wt), rice starch (9% wt), rice protein (7.5% wt), pea protein (7.5% wt), coconut oil (5% wt), and flavoring (0.5% wt). The green banana flour, starch, and protein were mixed until evenly combined, after which oil was added with continued stirring until the mixture resembled sand. The banana puree was added and mixed until a dough formed into a single mass.

The mass was formed into a log and rolled out on a sheeter to a thickness of 1.75 mm and then docked and cut into circles that were baked at 325° F. for 5 minutes, then at 220° F. for 30 minutes.

Example 17

Example 17 was made by formulating banana puree (44.6% wt), green banana flour (19.4% wt), rice starch (17.2% wt), rice protein (6.5% wt), pea protein (6.5% wt), canola oil (5.4% wt) and lecithin (0.4% wt). The green banana flour, starch, and protein were mixed until evenly combined, after which the oil and lecithin were added with continued stirring until the mixture resembled sand. The banana puree was added and mixed until a dough formed into a single mass.

The mass was laminated, sheeted, cut into circles and, after removing web scrap by pulling, baked for about 5 minutes in a multi-zone oven ranging between 275° F. and 420° F.

Example 18

Example 18 was made the same as Example 17 except that the puree was a combination of strawberry and banana puree at 43.4% by weight and the amount of rice starch was adjusted to 18.4% by weight.

Example 19

Example 17 was made by formulating banana puree (48.7% wt), green banana flour (18.0% wt), rice starch (16.0% wt), rice protein (6.0% wt), pea protein (6.0% wt), canola oil (5.0% wt) and lecithin (0.3% wt). The green banana flour, starch, and protein were mixed until evenly combined, after which the oil and lecithin were added with continued stirring until the mixture resembled sand. The banana puree was added and mixed until a dough formed into a single mass.

The mass was laminated, sheeted, cut into circles and, after removing web scrap by pulling, baked for about 5 minutes in a multi-zone oven ranging between 310° F. and 450° F.

Example 20

Example 20 was made by formulating banana puree (36.2% wt), apple flour (37.3% wt), rice starch (19.8% wt), canola oil (6.2% wt) and lecithin (0.5% wt). The apple flour and starch were mixed until evenly combined, after which the oil and lecithin were added with continued stirring until the mixture resembled sand. The banana puree was added and mixed until a dough formed into a single mass.

The mass was laminated, sheeted, cut into circles and baked at 325° F. for 5 minutes followed by baking at 225° F. for another 25 to 40 minutes.

Example 21

Example 21 was made by formulating banana puree (36.2% wt), apple flour (22.3% wt), rice starch (19.8% wt), rice protein (7.5% wt), pea protein (7.5% wt), canola oil (6.2% wt) and lecithin (0.5% wt). The apple flour, starch, and protein were mixed until evenly combined, after which the oil and lecithin were added with continued stirring until the mixture resembled sand. The banana puree was added and mixed until a dough formed into a single mass.

The mass was laminated, sheeted, cut into circles and baked at 325° F. for 5 minutes followed by baking at 225° F. for another 25 to 40 minutes.

Example 22

Example 22 was made by formulating banana puree (44.6% wt), apple fiber powder (32.4% wt), rice starch (17.2% wt), canola oil (5.4% wt) and lecithin (0.4% wt). The apple fiber powder and starch were mixed until evenly combined, after which the oil and lecithin were added with continued stirring until the mixture resembled sand. The banana puree was added and mixed until a dough formed into a single mass.

The mass was laminated, sheeted, cut into circles and baked at 325° F. for 5 minutes followed by baking at 225° F. for another 25 to 40 minutes.

Example 23

Example 23 was made by formulating banana puree (44.6% wt), apple fiber powder (19.4% wt), rice starch (17.2% wt), rice protein (6.5% wt), pea protein (6.5% wt), canola oil (5.4% wt) and lecithin (0.4% wt). The apple fiber powder, starch, and protein were mixed until evenly combined, after which the oil and lecithin were added with continued stirring until the mixture resembled sand. The banana puree was added and mixed until a dough formed into a single mass.

The mass was laminated, sheeted, cut into circles and baked at 325° F. for 5 minutes followed by baking at 225° F. for another 25 to 40 minutes.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crispy textured ambient shelf-stable food product formed from a dough, the dough comprising
    at least 50% by weight of fruit flesh of at least one fruit;
    about 5% to about 25% by weight added starch; and
    about 2% to about 8% by weight fat,
    wherein the fruit flesh of the at least one fruit comprises at least one powdered fruit;
    wherein the at least one powdered fruit comprises green banana flour present in an amount of about 18% to 42.5% by weight of the dough;
    wherein the food product is substantially free of gluten and hydrocolloids; and
    wherein the food product has a moisture content of less than 4% by weight and exhibits reduced moisture uptake such that the food product has a moisture content of less than 7% by weight after 2 weeks exposure to ambient conditions of 50% humidity at 23° C.

2. The food product of claim 1, wherein the dough comprises at least 70% by weight of the fruit flesh of the at least one fruit.

3. The food product of claim 1, wherein the powdered fruit is about 35% to about 45% by weight of the total fruit content of the dough.

4. The food product of claim 1, wherein the dough comprises about 35% by weight to about 45% by weight total starch, the balance being provided by the fruit flesh of the at least one fruit.

5. The food product of claim 1, the dough further comprising about 5% by weight to about 15% by weight protein powder.

6. The food product of claim 1, the dough further comprising up to 1% by weight of an emulsifier.

7. The food product of claim 1, wherein the food product exhibits reduced moisture uptake such that the food product has a moisture content of less than 6.5% by weight after 4 weeks exposure to ambient conditions of 50% humidity at 23° C.

8. A crispy textured ambient shelf-stable food product formed from a dough, the dough comprising
    at least 70% by weight of fruit flesh of at least one fruit, wherein the fruit flesh of the at least one fruit comprises at least one powdered fruit;
    wherein the at least one powdered fruit comprises green banana flour in an amount of about 18 to 42.5% by weight of the dough;
    about 5% to about 25% by weight added starch, the dough comprising about 35% to about 45% by weight total starch, the balance of total starch being provided by the fruit flesh of the at least one fruit;
    fat; and
    up to 1% by weight of an emulsifier,
    wherein the food product has a glass transition temperature above 23° C. and a moisture content of less than 4% by weight and exhibits reduced moisture uptake such that the food product has a moisture content of less than 6.5% by weight after 4 weeks exposure to ambient conditions of 50% humidity at 23° C., the food product further being substantially free of hydrocolloids and gluten.

9. A method of making a food product comprising:
    mixing a composition comprising at least 50% by weight fruit flesh of at least one fruit, about 5% to about 25% by weight added starch, and fat to form a dough, wherein the fruit flesh of the at least one fruit comprises at least one powdered fruit and at least one fruit puree;
    wherein the at least one powdered fruit comprises green banana flour in an amount of about 18 to 42.5% by weight of the dough;
    wherein the step of mixing the composition comprises mixing the powdered fruit with the added starch and the fruit puree; then
    laminating the dough, wherein the dough is substantially free of gluten and hydrocolloids; and then
    baking the dough at a temperature in the range of 300° F. to 375° F. to remove moisture from the dough to an amount less than 4% by weight to form a crispy textured ambient shelf-stable food product that exhibits a moisture content of less than 7% by weight after 4 weeks exposure to ambient conditions of 50% humidity at 23° C.

10. The method of claim 9, wherein the food product is substantially free of gluten and the baking is accomplished at atmospheric pressures.

11. The method of claim 9 further comprising sheeting the dough to a thickness between 1 and 3 mm prior to the step of baking.

12. The method of claim 9 further comprising high pressure extrusion.

13. The method of claim 9, wherein the composition further comprises up to 1% by weight of an emulsifier.

14. The food product of claim 8, wherein the at least one fruit is selected from the group consisting of apple, apricot, banana, strawberry, blueberry, raspberry, blackberry, acai berry, boysenberry, gooseberry, elderberry, cherry, grapefruit, orange, lemon, lime, tangerine, ugli fruit, fig, grape, guava, jackfruit, kiwi fruit, mango, cantaloupe, honeydew, watermelon, nectarine, peach, pear, papaya, passion fruit, pawpaw, pineapple, plantain, plum, and quince.

15. The method of claim 9, wherein the baking is a single baking step and the baking increases a glass transition temperature from below 23° C. for the dough to above 23° C. for the food product.

* * * * *